United States Patent
Mishima (10) Patent No.: US 8,243,959 B2
(45) Date of Patent: Aug. 14, 2012

(54) AUDIO OUTPUT CONTROL DEVICE AND AUDIO OUTPUT CONTROL METHOD

(75) Inventor: Kazuo Mishima, Kanagawa (JP)

(73) Assignee: Sony Corporation (JP)

( * ) Notice: Subject to any disclaimer, the term of this patent is extended or adjusted under 35 U.S.C. 154(b) by 617 days.

(21) Appl. No.: 12/291,760

(22) Filed: Nov. 13, 2008

(65) Prior Publication Data

US 2009/0136060 A1    May 28, 2009

(30) Foreign Application Priority Data

Nov. 28, 2007 (JP) .............................. P2007-307617

(51) Int. Cl.
*H04R 3/00* (2006.01)

(52) U.S. Cl. ........ 381/111; 381/105; 381/106; 381/107; 348/565; 348/E05.112

(58) Field of Classification Search .......... 381/104–107, 381/74–76, 94, 384; 700/94; 348/564–565
See application file for complete search history.

(56) References Cited

U.S. PATENT DOCUMENTS

2007/0287435 A1* 12/2007 Kim et al. .................. 455/414.2
2009/0182563 A1*  7/2009 Schobben et al. ............ 704/500

FOREIGN PATENT DOCUMENTS

JP          09-307833 A    11/1997
JP    P2004-221796 A  *  8/2004

* cited by examiner

*Primary Examiner* — Evan Pert
*Assistant Examiner* — Mark A Laurenzi
(74) *Attorney, Agent, or Firm* — Lerner, David, Littenberg, Krumholz & Mentlik, LLP (57) ABSTRACT

An audio output control device includes: display means for displaying two screens; speaker output control means for recognizing whether a main screen or a sub screen is being selected on the display means that is displaying the two screens and performing a control process to output a main or sub sound of the selected main or sub screen through a speaker; and headphone output control means for, before a headphone is connected, performing a control process to supply to a headphone terminal of the headphone the sub or main sound of the sub or main screen that is not being selected.

3 Claims, 5 Drawing Sheets

AUDIO OUTPUT CONTROL DEVICE AND AUDIO OUTPUT CONTROL METHOD

CROSS REFERENCES TO RELATED APPLICATIONS

The present application claims priority from Japanese Patent Application No. JP 2007-307617, filed in the Japanese Patent Office on Nov. 28, 2007, the entire content of which is incorporated herein by reference.

BACKGROUND OF THE INVENTION

1. Field of the Invention

The present invention relates to an audio output control device and an audio output control method, and is preferably applied to a digital television set that can display two screens at one time, for example.

2. Description of the Related Art

An existing digital television set has a function called two-screen mode. When a user pushes a two-screen button, the digital television set switches from a normal one-screen mode to the two-screen mode. In this case, generally, on the left side of the digital television set is a main screen, while a sub screen is on the right side.

In the two-screen mode, only when the main screen is selected, the digital television set outputs only the main sound of the main screen via a speaker attached to the digital television set.

And in the digital television set, when a right and left arrows button of a remote controller is operated, the digital television set selects, instead of the left-hand main screen, the right-hand sub screen accordingly.

In this case, even though two screens are being displayed on the digital television set, the digital television set emphasizes the main screen in such a way as if the frame of the main screen is selected by a cursor, for example. Accordingly, the fact that the speaker is outputting the main sound of the main screen is visually understandable.

Accordingly, when a right arrow button of the remote controller is pushed, the digital television set performs a switching process. As a result, the frame of the sub screen is emphasized, and the sub sound of the sub screen is being output through the speaker. The above is a usual two-screen mode audio switching method.

By the way, the digital television set has a headphone mode 1: in headphone mode 1, when a headphone is connected to the digital television set, the digital television set stops the output of the above speaker, and outputs the main or sub sound of the selected main or sub screen through the headphone.

Moreover, the digital television set displays a menu on the selected main or sub screen after a user pushes a menu button of the remote controller. From the menu, a headphone mode 2 can be selected.

However, an audio output pattern (regarding the speaker output and the headphone output) of the digital television set to which the headphone is connected is different from when the headphone is not connected, if the headphone mode 2 is selected from the menu.

Figure 1:
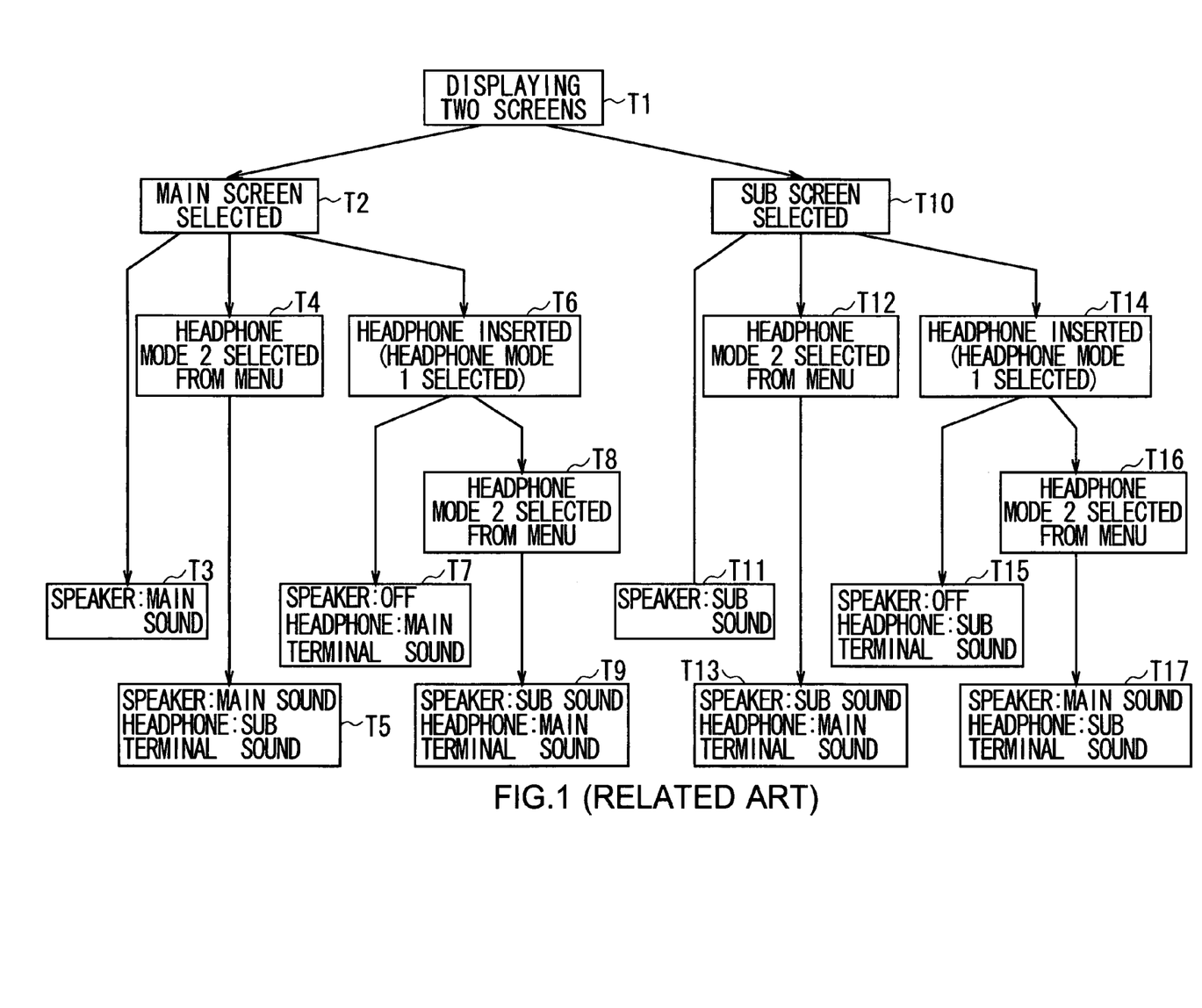
FIG. 1 is a state transition diagram illustrating the result of the existing audio output switching method

In reality, as shown in FIG. 1, when the digital television set switches from State T1, in which the two screens are displayed, to State T2, in which the main screen is selected, after a left arrow button of the remote controller is pushed, the speaker becomes State T3 in which only the main sound of the main screen is being output.

Incidentally, even though a TV program's video image is being displayed on the sub screen, the digital television set does not output the sub sound of the sub screen via the speaker, because the main screen is selected.

Moreover, during State T2 in which the main screen is being selected, the digital television set displays the menu on the main screen if the menu button of the remote controller is pushed by a user, who can then select the headphone mode 1 or 2 from the menu. If the digital television set enters State T4 after the selection of the headphone mode 2, the speaker keeps outputting the main sound, and the digital television set then proceeds to State T5 in which the sub sound of the sub screen is supplied to a headphone terminal.

This means that if the headphone was already connected to the headphone terminal of the digital television set, the sub sound would be immediately output through the headphone.

Moreover, during State T2 in which the main screen is being selected, the digital television set may enter State T6 in which the headphone is connected. This substantially means that the headphone mode 1 is selected. In this case, the digital television set stops the output of the main sound through the speaker, and then enters State T7 in which the main sound is output from the headphone via the headphone terminal.

In this case, in State T7, while watching the video image of the main screen, a user listens to the main sound of the main screen only from the headphone.

Incidentally, during State T6 in which the headphone is connected, if the menu button is pushed, the digital television set displays the menu on the main screen. After the headphone mode 2 is selected from the menu in State T8, the digital television set enters State T9 in which the sub sound of the sub screen is output from the speaker, and the main sound of the main screen continues to be output from the headphone via the headphone terminal.

On the other hand, if the digital television set switches from State T1, in which the two screens are displayed, to State T10, in which a sub screen is selected, after the right arrow button of the remote controller is pushed, the digital television set enters State T11 in which only the sub sound of the sub screen is output from the speaker.

Incidentally, even in this case, the digital television set is displaying the TV program's video image on the main screen. However, the speaker stops the output of the main sound of the main screen, because the sub screen is selected.

Moreover, during State T10 in which the sub screen is being selected, the digital television set displays the menu on the sub screen if the menu button of the remote controller is pushed by a user. If the digital television set enters State T12 after the selection of the headphone mode 2 from the menu, the speaker keeps outputting the sub sound, and the digital television set then proceeds to State T13 in which the main sound of the main screen is supplied to the headphone terminal.

This means that if the headphone was already connected to the headphone terminal of the digital television set, the main sound would be immediately output through the headphone.

Moreover, during State T10 in which the sub screen is being selected, the digital television set may enter State T14 in which the headphone is connected. This substantially means that the headphone mode 1 is selected. In this case, the digital television set stops the output of the sub sound through the speaker, and then enters State T15 in which the sub sound is output from the headphone via the headphone terminal.

In this case, in State T15, while watching the video image of the sub screen, a user listens to the sub sound of the sub screen only from the headphone.

Incidentally, during State T14 in which the headphone is connected, if the menu button is pushed, the digital television set displays the menu on the sub screen. If the headphone mode 2 is selected from the menu in State 16, the digital television set enters State T17 in which the main sound of the main screen is output from the speaker, and the sub sound of the sub screen continues to be output from the headphone.

In this manner, with the main or sub screen being selected, the digital television set stops the output of sound from the speaker after the headphone is connected, and starts to output the sound from the headphone.

On the other hand, if the headphone mode 2 is selected from the menu, the digital television set outputs sounds from both the speaker and the headphone. However, which sound the headphone or the speaker outputs depends on which operation is performed first, i.e. entering the menu or connecting the headphone.

On the other hand, as a video device that can display two screens, the one that outputs sound from either a Lch speaker or a Rch speaker and controls the audio volume balance exists (see Jpn. Pat. Laid-open Publication No. H9-307833).

SUMMARY OF THE INVENTION

By the way, in the above digital television set, the complexity of the audio output pattern regarding the speaker output and the headphone output may confuse a user. Accordingly, the digital television set may not be easy-to-use, because it is difficult for a user to set his/her desired audio output pattern.

The present invention has been made in view of the above points and is intended to provide an audio output control device and audio output control method that offers easy-to-understand audio output patterns and allows a user to easily set an audio output pattern without being confused.

In one aspect of the present invention, an audio output control device includes: display means for displaying two screens; speaker output control means for recognizing whether a main screen or a sub screen is being selected on the display means that is displaying the two screens and performing a control process to output a main or sub sound of the selected main or sub screen through a speaker; and headphone output control means for, before a headphone is connected, performing a control process to supply to a headphone terminal of the headphone the sub or main sound of the sub or main screen that is not being selected.

In this manner, while outputting the main or sub sound of the selected main or sub screen through the speaker, the device supplies to the headphone terminal the sub or main sound of the sub or main screen that is not being selected. Therefore, what the headphone always outputs after it is connected is the sub or main sound of the sub or main screen that is not being selected. This allows a user to easily set an audio output pattern, which depends on whether the headphone is connected or not.

In another aspect of the present invention, an audio output control method includes: a recognition step of, by using predetermined recognition means, recognizing whether a main screen or a sub screen is being selected on display means that is displaying the two screens; a speaker output control step of, by using speaker output control means, performing a control process to output a main or sub sound of the selected main or sub screen through a speaker, the selected main or sub screen recognized at the recognition step; and a headphone output control step of, by using headphone output control means, performing a control process before a headphone is connected to supply to a headphone terminal of the headphone the sub or main sound of the sub or main screen that is not being selected.

In this manner, while outputting the main or sub sound of the selected main or sub screen through the speaker, the device supplies to the headphone terminal the sub or main sound of the sub or main screen that is not being selected. Therefore, what the headphone always outputs after it is connected is the sub or main sound of the sub or main screen that is not being selected. This allows a user to easily set an audio output pattern, which depends on whether the headphone is connected or not.

According to an embodiment of the present invention, while outputting the main or sub sound of the selected main or sub screen through the speaker, the device supplies to the headphone terminal the sub or main sound of the sub or main screen that is not being selected. Therefore, what the headphone always outputs after it is connected is the sub or main sound of the sub or main screen that is not being selected. This allows a user to easily set an audio output pattern, which depends on whether the headphone is connected or not. Thus, the audio output control device and audio output control method that offers easy-to-understand audio output patterns and allows a user to easily set an audio output pattern without being confused can be realized.

The nature, principle and utility of the invention will become more apparent from the following detailed description when read in conjunction with the accompanying drawings in which like parts are designated by like reference numerals or characters.

DETAILED DESCRIPTION OF PREFERRED EMBODIMENTS

An embodiment of the present invention will be described in detail with reference to the accompanying drawings.
(1) Configuration of Digital Television Set In FIG. 2, the reference numeral 1 denotes a digital television set as a whole. The digital television set includes the functions of an audio output control device. The digital television set 1 includes a television microcomputer 2. The TV microcomputer 2 takes overall control of the digital television set 1.

Figure 2:
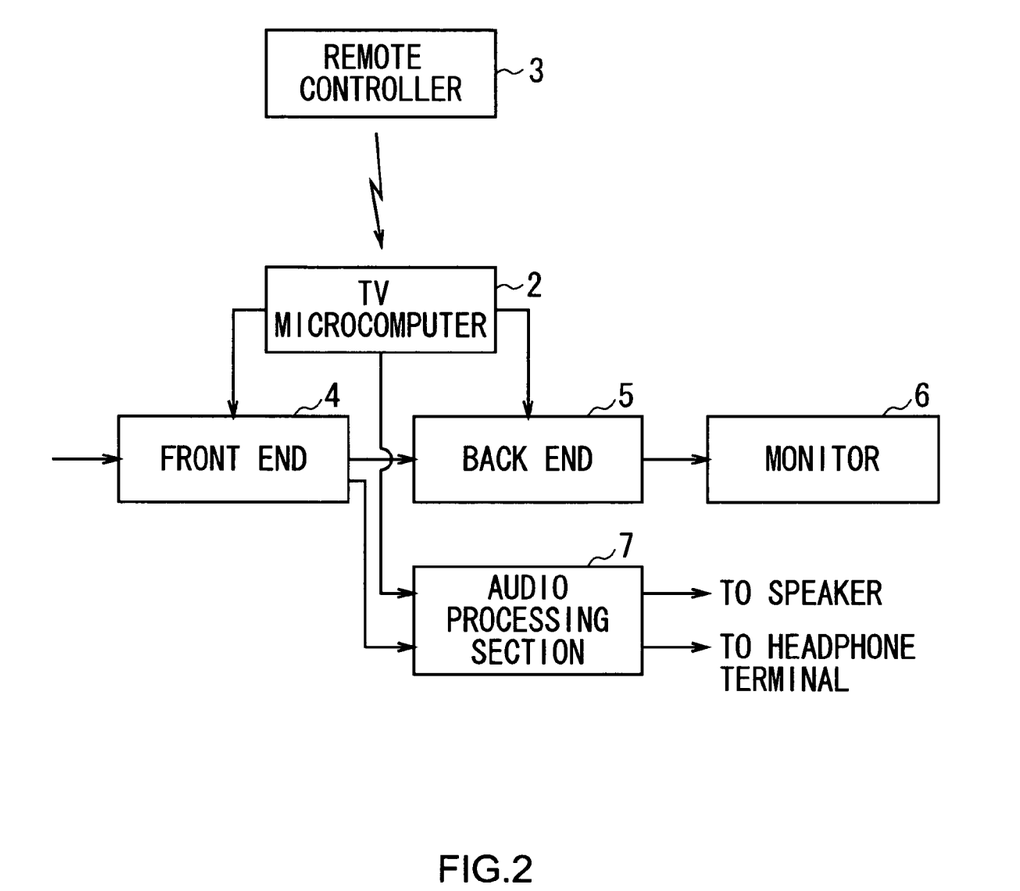
FIG. 2 is a schematic block diagram illustrating the configuration of a digital television set.

When a command is supplied from a remote controller 3, the TV microcomputer 2 of the digital television set 1 follows the command and supplies a channel switching signal to a front end 4 or a two-screen mode switching signal to a back end 5. The two-screen mode switching signal is used for switching the mode to two-screen mode.

The front end 4 follows the channel switching signal supplied from the TV microcomputer 2, and chooses from among digital terrestrial television signals the one (broadcast signal) a user wants to select: the digital terrestrial television signals are received by an antenna (not shown). The front end 4 includes two tuners (not shown). This allows the front end 4 to tune in to two channels' broadcast signals at one time.

The front end 4 converts the selected one-channel broadcast signals or two-channel broadcast signals into intermediate frequency signals with a predetermined frequency range, and divides them into video and audio data before decoding. The front end 4 then supplies video signals to the back end 5 and audio signals to an audio processing section 7.

The audio processing section 7 performs a predetermined signal processing process for the audio signals supplied from the front end 4, amplifies them to predetermined level, and supplies the audio signals to a speaker or a headphone terminal.

Figure 3:
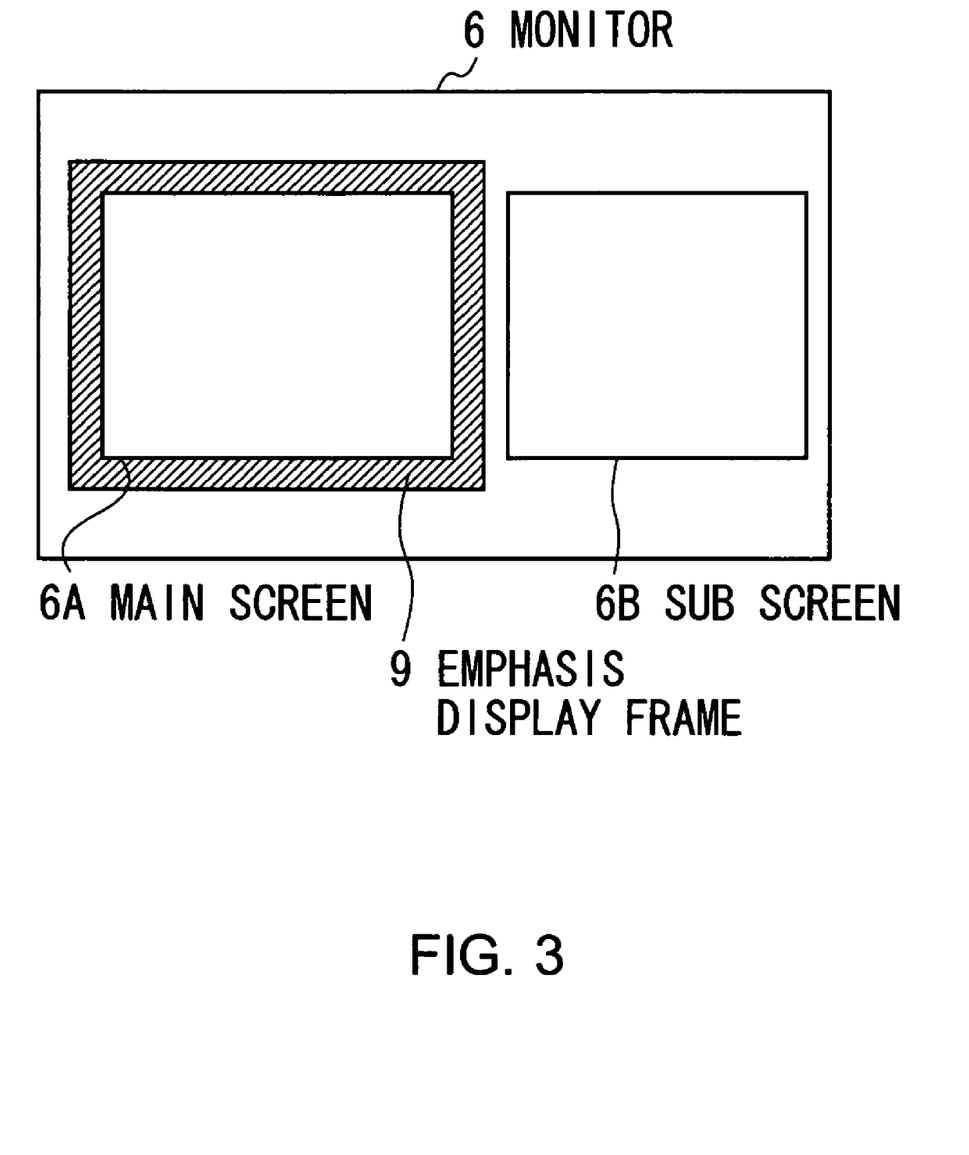
FIG. 3 is a schematic diagram illustrating an example of two-screen mode.

As shown in FIG. 3, the back end 5 follows the two-screen mode switching signal supplied from the TV microcomputer 2, and displays a main screen 6A on the light side of a monitor 6 and a sub screen 6B on the right side of the monitor 6. The monitor 6 may be a liquid crystal display or the like.

Moreover, according to the default setting, the back end 5 selects the main screen 6A of the monitor 6. Accordingly, the back end 5 displays an emphasis display frame 9 (shaded portion) around the main screen 6A to indicate that the main screen 6A is being selected.

At this time, the TV microcomputer 2 outputs via the audio processing section 7 from the speaker (not shown) the main sound corresponding to a main video image being displayed on the selected main screen 6A, while not outputting the sub sound corresponding to a sub video image being displayed on the sub screen 6B from the speaker.

If the TV microcomputer 2 selects the sub screen 6B after a user pushes a right arrow button (not shown) of the remote controller 3, the TV microcomputer 2 displays the emphasis display frame 9 for the sub screen 6B. At the same time, the TV microcomputer 2 performs a switching process to output via the audio processing section 7 from the speaker the sub sound corresponding to the sub video image being displayed on the selected sub screen 6B.

The above audio switching method for the two-screen mode is a typical one that has been conducted in the past. In addition to such an audio switching method, this digital television set performs an audio output control process that allows a user to intuitively and easily understand even when a headphone is connected.

(2) Procedure of Audio Output Control Process for Two-screen Mode

Figure 4:
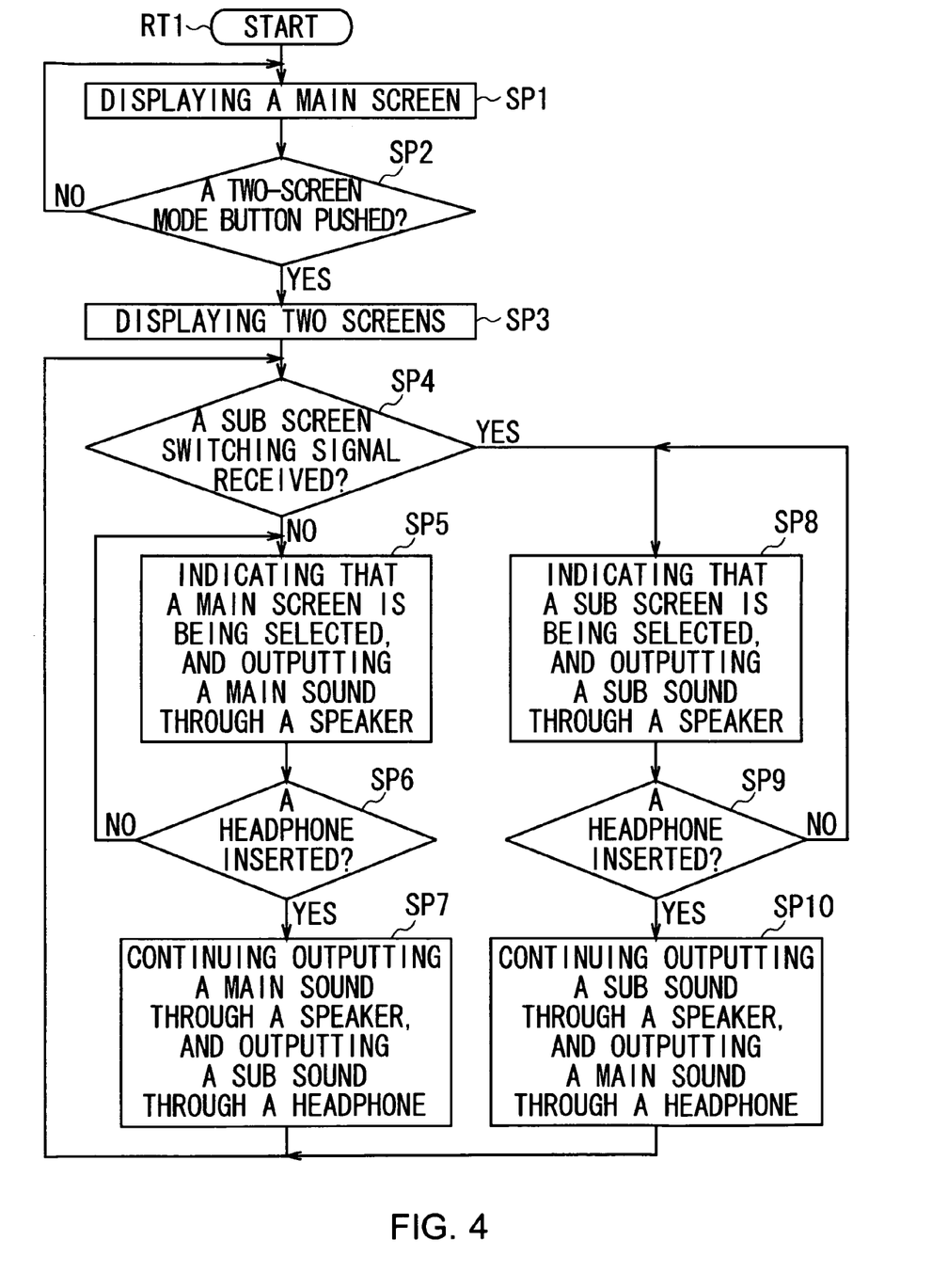
FIG. 4 is a flowchart illustrating the procedure of an audio output control process in two-screen mode according to an embodiment of the present invention.

As shown in FIG. 4, the TV microcomputer 2 of the digital television set 1 enters a start step of a routine RT1, and then proceeds to step SP1. At step SP1, the TV microcomputer 2 displays only one screen, or the main screen 6A, on the monitor 6, and then proceeds to next step SP2.

At step SP2, the TV microcomputer 2 of the digital television set 1 makes a determination as to whether a two-screen mode button (not shown) of the remote controller 3 has been pushed by a user. If the negative result is obtained, this means that the two-screen mode button has not been pushed, and that the user wants only the main screen 6A to continue to be displayed. Accordingly, the TV microcomputer 2 returns to step SP1, and keeps displaying only the main screen 6A.

Whereas if the affirmative result is obtained at step SP2, this means that the user wants to switch the mode from one-screen mode to two-screen mode. Accordingly, the TV microcomputer 2 proceeds to next step SP3.

At step SP3, after the two-screen mode button is pushed, the TV microcomputer 2 switches the mode from one-screen mode to two-screen mode to display two screens on the monitor 6 (FIG. 3), and then proceeds to step SP4.

At step SP4, the TV microcomputer 2 makes a determination as to whether it has received a sub screen switching signal, which is supplied when the right arrow button (not shown) of the remote controller 3 is pushed by a user in order to select the sub screen 6B at the time when the default main screen 6A is being displayed in two-screen mode.

If the negative result is obtained, this means that the TV microcomputer 2 has not received the sub screen switching signal, and that it continues to select the default main screen 6A. At this time, the TV microcomputer 2 proceeds to next step SP5.

At step SP5, the TV microcomputer 2 indicates that the main screen 6A is being selected by displaying the emphasis display frame 9 around the main screen 6A, and outputs the main sound from the speaker. The TV microcomputer 2 then proceeds to next step SP6.

At this time, while outputting the main sound from the speaker, the TV microcomputer 2 supplies the sub sound of the sub screen 6B to the headphone terminal (not shown). If a headphone is connected to the headphone terminal, the TV microcomputer 2 promptly outputs the sub sound from the headphone.

At step SP6, when the main screen 6A is being selected with the speaker outputting the main sound, the TV microcomputer 2 makes a determination as to whether the headphone has been connected to the headphone terminal. If the negative result is obtained, the TV microcomputer 2 returns to step SP5; if the affirmative result is obtained, the TV microcomputer 2 proceeds to step SP7.

At step SP7, while the speaker keeps outputting the main sound of the main screen 6A, the headphone connected to the headphone terminal immediately starts to output the sub sound, because the TV microcomputer 2 has been supplying the sub sound of the sub screen 6B to the headphone terminal. The TV microcomputer 2 then returns to step SP4 and repeat the above processes.

On the other hand, if the affirmative result is obtained at step SP4, this means that the TV microcomputer 2 has received the sub screen switching signal, and that the user wants the speaker to output the sub sound of the sub screen 6B. Accordingly, the TV microcomputer 2 proceeds to next step SP8.

At step SP8, after receiving the sub screen switching signal, the TV microcomputer 2 performs a switching process to replace the default main screen 6A with the sub screen 6B, displays the emphasis display frame 9 to indicate that the sub screen 6B is being selected, and lets the speaker output the sub sound instead of the main sound. The TV microcomputer 2 then proceeds to next step SP9.

At this time, while outputting only the sub sound through the speaker, the TV microcomputer 2 supplies the main sound of the main screen 6A to the headphone terminal (not shown). Accordingly, when the headphone is connected to the headphone terminal, the main sound is promptly outputted through the headphone.

At step SP9, while selecting the sub screen 6B and outputting the sub sound through the speaker, the TV microcomputer 2 makes a determination as to whether the headphone has been connected to the headphone terminal. If the negative result is obtained, the TV microcomputer 2 returns to step SP8; if the affirmative result is obtained, the TV microcomputer 2 proceeds to step SP10.

At step SP10, the TV microcomputer 2 continues outputting the sub sound of the sub screen 6B through the speaker; since the TV microcomputer 2 is supplying the main sound of the main screen 6A to the headphone terminal, the main sound is promptly output through the headphone connected to the headphone terminal. After that, the TV microcomputer 2 returns to step SP4 and repeats the above processes.

(3) Result of Audio Output Control for Two-Screen Mode

Figure 5:
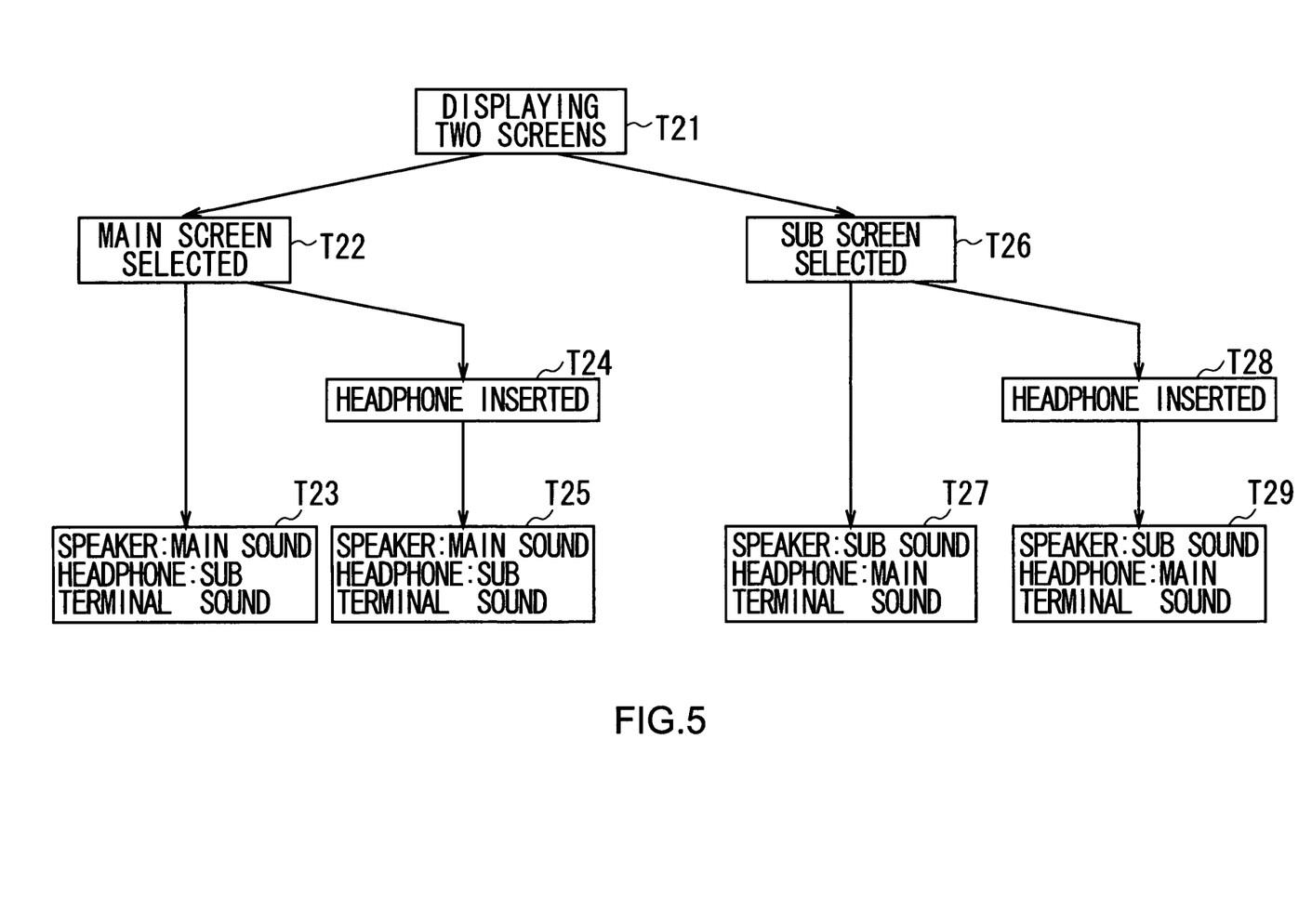
FIG. 5 is a state transition diagram illustrating the result of the audio output control process in two-screen mode according to an embodiment of the present invention.

By performing the above procedure of the audio output control process (FIG. 4), the TV microcomputer 2 of the digital television set 1 is able to set an audio output pattern as shown in FIG. 5.

In reality, if the digital television set 1 switches from State T21 in which it displays the screens in two-screen mode to State T22 in which the default main screen 6A is selected, the digital television set 1 then enters State T23 in which the speaker outputs only the main sound of the main screen 6A with the sub sound of the sub screen 6B being supplied to the headphone terminal.

Moreover, if the digital television set 1 switches from State T22 in which the main screen 6A is being selected to State T24 in which the headphone is connected, the digital television set 1 enters State T25 in which it continues outputting the main sound through the speaker and also outputs the sub sound through the headphone connected to the headphone terminal.

Accordingly, in State T22, the digital television set 1 allows a user to watch the video image of the main screen 6A and listen to the main sound of the main screen 6A through the speaker. In addition, the digital television set 1 allows another user to watch the video image of the sub screen 6B and listen to the sub sound of the sub screen 6B through the headphone.

On the other hand, if the right arrow button of the remote controller 3 is pushed in order to switch from State T21 in which the screens are displayed in two-screen mode to State T26 in which the sub screen 6B is selected, the digital television set 1 enters State ST27 in which the speaker outputs only the sub sound of the sub screen 6B with the main sound of the main screen 6A being supplied to the headphone terminal.

Moreover, if the digital television set 1 switches from State T26 in which the sub screen 6B is being selected to State T28 in which the headphone is connected, the digital television set 1 enters State T29 in which it continues outputting the sub sound through the speaker and also outputs the main sound through the headphone connected to the headphone terminal.

Accordingly, in State T26, the digital television set 1 allows a user to watch the video image of the sub screen 6B and listen to the sub sound of the sub screen 6B through the speaker. In addition, the digital television set 1 allows another user to watch the video image of the main screen 6A and listen to the main sound of the main screen 6A through the headphone.

In this manner, after the headphone is connected to the digital television set 1 that is selecting the main screen 6A or the sub screen 6B, the digital television set 1 continues outputting the same sound through the speaker; the digital television set 1 also allows the headphone to promptly output the sub or main sound of the sub or main screen 6B or 6A that is not being selected.

(4) Operation and Effect

As described above, if the main screen 6A is being selected in two-screen mode, the digital television set 1 outputs the main sound through the speaker and supplies to the headphone terminal the sub sound of the sub screen 6B that is not being selected.

Accordingly, immediately after the headphone is connected to the headphone terminal, the digital television set 1 outputs the sub sound, which is being supplied to the headphone terminal, through the headphone without requiring any special operation.

Moreover, if the sub screen 6B is being selected in two-screen mode, the digital television set 1 outputs the sub sound through the speaker and supplies to the headphone terminal the main sound of the main screen 6A that is not being selected.

Accordingly, immediately after the headphone is connected to the headphone terminal, the digital television set 1 outputs the main sound, which is being supplied to the headphone terminal, through the headphone without requiring any special operation.

In this manner, while continuing outputting through the speaker the main or sub sound of the main or sub screen 6A or 6B which is being selected, the digital television set 1 supplies to the headphone terminal the sub or main sound of the sub or main screen 6B or 6A which is not being selected. Accordingly, immediately after the headphone is connected to the headphone terminal, the sub or main sound that is being supplied to the headphone terminal is output through the headphone.

Moreover, the digital television set 1 is designed to always output the main or sub sound of the main or sub screen 6A or 6B that is being selected through the speaker while always outputting through the headphone the sub or main sound of the sub or main screen 6B or 6A that is not being selected. Accordingly, even if the headphone is connected, the speaker continues outputting the same sound; the headphone always outputs the sound that is not being output from the speaker. This allows a user to easily and intuitively understand the audio output pattern.

Therefore, the digital television set 1 does not confuse users: the user can easily set the audio output pattern regarding the speaker output and the headphone output, because of simple operation of selecting the main or sub screen 6A or 6B in two-screen mode in a usual manner and connecting the headphone.

According to the above configuration, without confusing users, the digital television set 1 in two-screen mode can set the audio output pattern regarding the speaker and headphone outputting the main and sub sounds of the main and sub screens 6A and 6B. This dramatically improves the operability of the digital television set 1 for users who listen to the sound through the speaker and the headphone.

(5) Other Embodiments

In the above-noted embodiment, when the main screen 6A is being selected, the speaker outputs the main sound with the sub sound of the sub screen 6B being supplied to the headphone terminal; when the sub screen 6B is being selected, the speaker outputs the sub sound with the main sound of the main screen 6A being supplied to the headphone terminal. However, the present invention is not limited to this. The following case would be possible: when the main screen 6A is being selected, the speaker outputs the sub sound of the sub screen 6B with the main sound of the main screen 6A being supplied to the headphone terminal; when the sub screen 6B is being selected, the speaker outputs the main sound of the main screen 6A with the sub sound of the sub screen 6B being supplied to the headphone terminal.

Even in this case, whatever happens, the audio output pattern remains unchanged regarding the speaker and headphone outputting the main and sub sounds of the main and sub screens 6A and 6B. This does not confuse users.

Moreover, in the above-noted embodiment, even after the headphone is connected, the speaker continues outputting the sound. However, the present invention is not limited to this. After the headphone is connected, the speaker may be forced to stop the output of the sound. In this case, since the speaker does not output any sound, a user can concentrate on the sound output from the headphone without being irritated by the sound from the speaker.

Furthermore, in the above-noted embodiment, even after the headphone is connected, the speaker continues outputting the sound. However, the present invention is not limited to this. If a quiet button (not shown) is pushed after the headphone is connected, the speaker may stop the output of the sound. In this case, since the speaker does not output any sound, a user can concentrate on the sound output from the headphone without being irritated by the sound from the speaker.

Furthermore, in the above-noted embodiment, an audio output control device includes the monitor 6, which is the equivalent of display means, and the TV microcomputer 2, which is the equivalent of speaker output control and headphone output control means. However, the present invention is not limited to this. The audio output control device may include the display means, speaker output control means and headphone output control means that have different configurations.

The above audio output control device and audio output control method can be applied to various electronic devices, including a personal computer that is equipped with a monitor and a headphone terminal and that can display two screens at one time, and a portable terminal that can receive one-segment digital terrestrial television broadcasts, as well as digital television sets.

It should be understood by those skilled in the art that various modifications, combinations, sub-combinations and alterations may occur depending on design requirements and other factors insofar as they are within the scope of the appended claims or the equivalents thereof.

What is claimed is:

1. An audio output control device comprising:
display means for displaying two screens;
speaker output control means for recognizing whether a main screen or a sub screen is being selected on the display means that is displaying the two screens and performing a control process to output a main or sub sound of the selected main or sub screen through a speaker; and
headphone output control means for, before a headphone is connected to a headphone terminal, performing a control process to supply to the headphone terminal the sub or main sound of the sub or main screen that is not being selected,
wherein the speaker output control means control process to output a main or sub sound of the selected main or sub screen through a speaker and the headphone output control means control process to supply to the headphone terminal the sub or main sound of the sub or main screen that is not being selected are performed at the same time, and are performed both before and after the headphone is connected to the headphone terminal.

2. An audio output control method comprising:
a recognition step of, by using predetermined recognition means, recognizing whether a main screen or a sub screen is being selected on display means that is displaying the two screens;
a speaker output control step of, by using speaker output control means, performing a control process to output a main or sub sound of the selected main or sub screen through a speaker, the selected main or sub screen recognized at the recognition step; and
a headphone output control step of, by using headphone output control means, performing a control process before a headphone is connected to a headphone terminal to supply to the headphone terminal the sub or main sound of the sub or main screen that is not being selected,
wherein the speaker output control means control process to output a main or sub sound of the selected main or sub screen through a speaker and the headphone output control means control process to supply to the headphone terminal the sub or main sound of the sub or main screen that is not being selected are performed at the same time, and are performed both before and after the headphone is connected to the headphone terminal.

3. An audio output control device comprising:
a display section that displays two screens;
a speaker output control section that recognizes whether a main screen or a sub screen is being selected on the display section that is displaying the two screens and performs a control process to output a main or sub sound of the selected main or sub screen through a speaker; and
a headphone output control section that, before a headphone is connected to a headphone terminal, performs a control process to supply to the headphone terminal the sub or main sound of the sub or main screen that is not being selected,
wherein the speaker output control section control process to output a main or sub sound of the selected main or sub screen through a speaker and the headphone output control section control process to supply to the headphone terminal the sub or main sound of the sub or main screen that is not being selected are performed at the same time, and are performed both before and after the headphone is connected to the headphone terminal.

* * * * *